(12) United States Patent
Shigemitsu

(10) Patent No.: US 9,162,111 B2
(45) Date of Patent: *Oct. 20, 2015

(54) GOLF BALL RESIN COMPOSITION AND GOLF BALL

(75) Inventor: Takahiro Shigemitsu, Kobe (JP)

(73) Assignee: DUNLOP SPORTS CO. LTD., Kobe-shi (JP)

(*) Notice: Subject to any disclaimer, the term of this patent is extended or adjusted under 35 U.S.C. 154(b) by 487 days.

This patent is subject to a terminal disclaimer.

(21) Appl. No.: 13/085,635

(22) Filed: Apr. 13, 2011

(65) Prior Publication Data

US 2011/0263352 A1 Oct. 27, 2011

(30) Foreign Application Priority Data

Apr. 27, 2010 (JP) ................................. 2010-102534

(51) Int. Cl.
A63B 37/00 (2006.01)
C08L 23/08 (2006.01)

(52) U.S. Cl.
CPC ......... *A63B 37/0003* (2013.01); *A63B 37/0039* (2013.01); *A63B 37/0048* (2013.01); *C08L 23/0876* (2013.01); *A63B 37/0031* (2013.01); *A63B 37/0036* (2013.01); *A63B 37/0045* (2013.01); *A63B 37/0087* (2013.01); *A63B 37/0092* (2013.01); *A63B 37/0094* (2013.01)

(58) Field of Classification Search
None
See application file for complete search history.

(56) References Cited

U.S. PATENT DOCUMENTS

| | | | |
|---|---|---|---|
| 3,819,768 A | 6/1974 | Molitor | |
| 5,298,571 A | 3/1994 | Statz et al. | |
| 5,306,760 A | 4/1994 | Sullivan | |
| 5,312,857 A | 5/1994 | Sullivan | |
| 6,123,628 A * | 9/2000 | Ichikawa et al. | 473/371 |
| 6,329,458 B1 | 12/2001 | Takesue et al. | |
| 6,962,951 B1 | 11/2005 | Takesue et al. | |
| 7,211,610 B2 | 5/2007 | Takesue et al. | |
| 7,976,410 B2 * | 7/2011 | Shindo et al. | 473/373 |
| 8,349,958 B2 * | 1/2013 | Shigemitsu et al. | 525/196 |
| 2001/0018375 A1 | 8/2001 | Hayashi et al. | |
| 2002/0037968 A1 | 3/2002 | Chen | |
| 2002/0099120 A1 | 7/2002 | Takesue et al. | |
| 2002/0111407 A1 | 8/2002 | Takesue et al. | |
| 2004/0132552 A1 | 7/2004 | Chen | |
| 2005/0170910 A1 | 8/2005 | Hayashi | |
| 2005/0256269 A1 | 11/2005 | Takesue et al. | |
| 2006/0014898 A1 | 1/2006 | Kim | |
| 2006/0194649 A1 | 8/2006 | Hayashi | |
| 2006/0194650 A1 | 8/2006 | Hayashi | |
| 2006/0270491 A1 | 11/2006 | Jordan et al. | |
| 2007/0100075 A1 * | 5/2007 | Takesue | 525/125 |
| 2008/0287217 A1 | 11/2008 | Takesue et al. | |
| 2009/0111612 A1 | 4/2009 | Nanba et al. | |
| 2009/0233732 A1 * | 9/2009 | Shindo et al. | 473/372 |
| 2010/0069173 A1 | 3/2010 | Okabe et al. | |
| 2010/0069177 A1 | 3/2010 | Okabe | |
| 2010/0075777 A1 * | 3/2010 | Shigemitsu et al. | 473/372 |
| 2010/0093466 A1 | 4/2010 | Ohama et al. | |
| 2010/0160080 A1 * | 6/2010 | Isogawa et al. | 473/373 |
| 2010/0167846 A1 | 7/2010 | Hirau et al. | |
| 2010/0298066 A1 | 11/2010 | Kim | |
| 2011/0319192 A1 | 12/2011 | Shigemitsu | |
| 2011/0319196 A1 * | 12/2011 | Shigemitsu | 473/377 |

FOREIGN PATENT DOCUMENTS

| | | |
|---|---|---|
| EP | 0 693 091 B1 | 10/1997 |
| JP | 6-292740 A | 10/1994 |
| JP | 2000-157646 A | 6/2000 |
| JP | 2001-120686 A | 5/2001 |
| JP | 2001-218873 A | 8/2001 |
| JP | 2002-177414 A | 6/2002 |
| JP | 2002-219195 A | 8/2002 |
| JP | 2005-218858 A | 8/2005 |
| JP | 2006-500995 A | 1/2006 |
| JP | 2006-28517 A | 2/2006 |
| JP | 2009-106739 A | 5/2009 |
| JP | 2010-69251 A | 4/2010 |
| JP | 2010-88797 A | 4/2010 |
| JP | 2010-94393 A | 4/2010 |

OTHER PUBLICATIONS

Japanese Notice of Reasons for Rejection, dated Mar. 27, 2012, for Japanese Application No. 2010-102534 (English Translation Only provided).
English translation of Japanese Office Action, dated Jul. 9, 2013, for Japanese Application No. 2010-147815.
English translation of Japanese Office Action, dated Jul. 9, 2013, for Japanese Application No. 2010-147816.
English translation of Japanese Office Action, dated Mar. 27, 2012, for Japanese Application No. 2010-102533.
Honeywell, "A-C® Polyethylenes & Copolymers", Honeywell product literature, Apr. 2000, 2 pages.

(Continued)

*Primary Examiner* — David Buttner
(74) *Attorney, Agent, or Firm* — Birch, Stewart, Kolasch & Birch, LLP

(57) ABSTRACT

An object of the present invention is to provide a golf ball resin composition containing an ionomer resin with an excellent resilience and fluidity. Another object of the present invention is to provide a golf ball using an ionomer resin for an intermediate layer, with an excellent shot feeling, durability and resilience. The present invention provides a golf ball resin composition comprising (A) an ionomer resin consisting of a metal ion-neutralized product of a ternary copolymer composed of an olefin, an α,β-unsaturated carboxylic acid having 3 to 8 carbon atoms and an α,β-unsaturated carboxylic acid ester; (B) a binary copolymer composed of an olefin and an α,β-unsaturated carboxylic acid having 3 to 8 carbon atoms and/or a ternary copolymer composed of an olefin, an α,β-unsaturated carboxylic acid having 3 to 8 carbon atoms and an α,β-unsaturated carboxylic acid ester, and (C) a zinc compound, wherein a content ratio ((A)/(B)) of (A) component to (B) component ranges from 50/50 to 80/20 in a mass ratio and a content of (C) component ranges from 0.1 part to 20 parts with respect to 100 parts by mass of a sum of (A) component and (B) component, and the golf ball resin composition has a melt flow rate (190° C., 2.16 kg) of 5 g/10 min or more.

11 Claims, 1 Drawing Sheet

(56) References Cited

OTHER PUBLICATIONS

Honeywell, "AClyn® 201A", Honeywell product literature, 1 page.
Honeywell, "AClyn® 295P", Honeywell product literature, 1 page.
US Office Action, dated Jun. 19, 2013, for U.S. Appl. No. 13/084,128.
US Office Action, dated May 31, 2012, for U.S. Appl. No. 12/554,155.
English translation of Japanese Office Action, dated Oct. 1, 2013, for Japanese Application No. 2010-147815.
English translation of Japanese Office Action, dated Oct. 15, 2013, for Japanese Application No. 2010-147816.

* cited by examiner

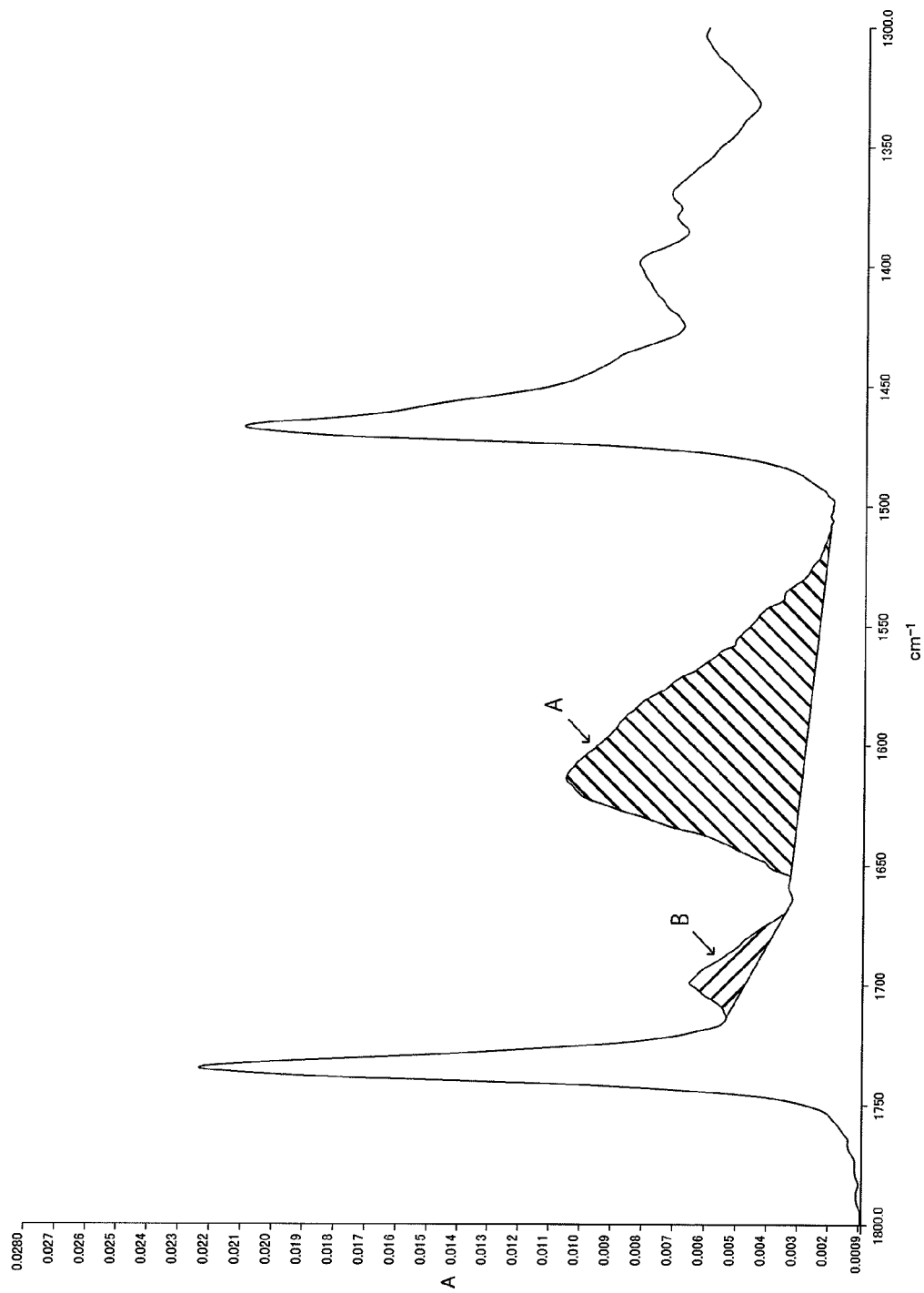

GOLF BALL RESIN COMPOSITION AND GOLF BALL

FIELD OF THE INVENTION

The present invention relates to a golf ball resin composition containing an ionomer resin and a golf ball using the same.

DESCRIPTION OF THE RELATED ART

As a golf ball construction, a two-piece golf ball comprising a core and a cover, a three-piece golf ball comprising a core consisting of a center and a single-layered intermediate layer covering the center, and a cover covering the core, and a multi-piece golf ball comprising a core consisting of a center and at least two intermediate layer covering the center, and a cover covering the core are known. Ionomer resins are used as materials for each layer constituting golf balls. Use of the ionomer resins as the constituent member of the golf ball provides the golf ball traveling a great distance, because of its high stiffness. Accordingly, ionomer resins are widely used as a material constituting a cover or an intermediate layer of the golf ball. However, there still remains a room for further improvement with respect to the stiffness and fluidity thereof and various improvements have been proposed for improving these properties.

Japanese Patent Publication No. 2000-157646 A discloses a golf ball cover composition having a melt index (MI) of 1 dg/sec. or more and primarily comprising a mixture of a base resin, blended with (d) a metal soap obtained by neutralizing an organic acid having up to 29 carbon atoms with a monovalent to trivalent metal ion, in a mass ratio of the base resin to the metal soap being 95:5 to 80:20, wherein the base resin comprises an ionomer resin component containing (a) a ternary ionomer resin consisting of a metal ion neutralized product of an olefin-unsaturated carboxylic acid-unsaturated carboxylate copolymer having an acid content of 12 wt % or less, and (b) a binary ionomer resin consisting of a metal ion neutralized product of an olefin-unsaturated carboxylic acid copolymer having an acid content of 15 wt % or less in a ratio of 40:60 to 100:0; and (c) an unneutralized random copolymer composed of olefin and unsaturated carboxylic acid monomers, in a mass ratio of the ionomer resin component to (c) the unneutralized random copolymer being 75:25 to 100:0.

U.S. Pat. No. 5,312,857 discloses a golf ball comprising a core and a cover, wherein the cover consists essentially of 100 parts by weight of at least one ionomer resin and from about 25 to about 100 parts by weight of a metal stearate, wherein said ionomer resin is the reaction product of an olefin having from 2 to 8 carbon atoms and an unsaturated monocarboxylic acid having from 3 to 8 carbon atoms.

U.S. Pat. No. 5,306,760 discloses a golf ball comprising a core and a cover, wherein the cover consists essentially of 100 parts by weight of at least one ionomer resin and from about 25 to about 100 parts by weight of fatty acid salt, wherein said ionomer resin is the reaction product of an olefin having from 2 to 8 carbon atoms and an unsaturated monocarboxylic acid having from 3 to 8 carbon atoms.

Japanese Patent Publication No. H06-292740 A discloses a composition for a golf ball cover material which comprises (A) 15 to 90 parts by weight of metal salts of an ethylene/ethylenically unsaturated monocarboxylic acid copolymer having an ethylenically unsaturated monocarboxylic acid content of 10 to 30% by weight and a degree of neutralization of at least of 25 mole % and (B) 85 to 10 parts by weight of an ethylene/(meth)acrylate ester/ethylenically unsaturated monocarboxylic acid terpolymer having a (meth)acrylate ester content of 12 to 45% by weight and an ethylenically unsaturated monocarboxylic acid content of 0.5 to 5% by weight.

Japanese Patent Publication No. 2001-218873 A discloses a multi-piece golf ball comprising a solid core, an intermediate layer enclosing the solid core, and a cover enclosing the intermediate layer, wherein at least one of said intermediate layer and said cover is formed of a heated mixture comprising (a) 100 parts by weight of an olefin-unsaturated carboxylic acid random copolymer or an olefin-unsaturated carboxylic acid-unsaturated carboxylate random copolymer or both of them, (b) 5 to 80 parts by weight of a fatty acid having a molecular weight of at least 280 or a derivative thereof, and (c) 0.1 to 10 parts by weight of a basic inorganic metal compound capable of neutralizing acid groups in components (a) and (b), said heated mixture having a melt index of at least 1.0 dg/min, and wherein said intermediate layer has a Shore D hardness of 40 to 63, said cover has a Shore D hardness of 45 to 68, and the Shore D hardness of said solid core at its center is not greater than the Shore D hardness of said intermediate layer, which is not greater than the Shore D hardness of said cover.

Japanese Patent Publication No. 2002-219195 A discloses a golf ball material comprising a mixture which is composed of essential components: 100 pars by weight of a resinous component consisting of a base resin and (e) a non-ionomer thermoplastic elastomer, the base resin and the elastomer being blended in a weight ratio of 100:0 to 50:50; (c) 5 to 80 parts by weight of a fatty acid and/or fatty acid derivative having a molecular weight of 280 to 1,500; and (d) 0.1 to 10 parts by weight of a basic inorganic metal compound capable of neutralizing acidic groups left unneutralized in the base resin and component (c), wherein the base resin has (a) an olefin-unsaturated carboxylic acid binary random copolymer and/or a metal ion-neutralized olefin-unsaturated carboxylic acid binary random copolymer, blended with (b) an olefin-unsaturated carboxylic acid-unsaturated carboxylate ternary random copolymer and/or a metal ion neutralized olefin-unsaturated carboxylic acid-unsaturated carboxylate ternary random copolymer, in a weight ratio of 100:0 to 25:75.

SUMMARY OF THE INVENTION

Golf balls using ionomer resins with a high stiffness for the intermediate layer or the cover exhibit an excellent resilience, but tend to provide a poor shot feeling. An approach to employ a layer consisting of a soft ternary ionomer resin as a constituent member of the golf ball has been studied in order to improve the shot feeling. However, since the soft ternary ionomer resin has low fluidity, it is difficult to mold a thin layer. Further, if the layer consisting of the soft ternary ionomer resin becomes thick, the resultant golf ball has low resilience. As a result, the flight distance of the golf balls becomes short. Another approach to improve a flight distance is to use an ionomer resin having a high degree of neutralization. However, since the ionomer resin having a high degree of neutralization has low fluidity, it is extremely difficult to injection mold a thin cover or an intermediate layer. As a method of improving the fluidity of the ionomer resin, it is known that a fatty acid or a metal salt thereof is added to the ionomer resin having a high degree of neutralization. However, if the added amount is a certain amount or less, the effect of improving the fluidity is low, while if the added amount is a certain amount or more, the mechanical property of the material is lowered, which causes a problem of the lower durability of the golf ball.

The present invention has been achieved in view of the above circumstances. An object of the present invention is to provide a soft golf ball resin composition containing an ionomer resin with an excellent resilience and fluidity. Another object of the present invention is to provide a golf ball using an ionomer resin for an intermediate layer, with an excellent shot feeling, durability and resilience.

The present invention that has solved the above problems provides a golf ball resin composition comprising (A) an ionomer resin consisting of a metal ion-neutralized product of a ternary copolymer composed of an olefin, an $\alpha,\beta$-unsaturated carboxylic acid having 3 to 8 carbon atoms, and an $\alpha,\beta$-unsaturated carboxylic acid ester; (B) a binary copolymer composed of an olefin and an $\alpha,\beta$-unsaturated carboxylic acid having 3 to 8 carbon atoms and/or a ternary copolymer composed of an olefin, an $\alpha,\beta$-unsaturated carboxylic acid having 3 to 8 carbon atoms, and an $\alpha,\beta$-unsaturated carboxylic acid ester, and (C) a zinc compound, wherein a content ratio ((A)/(B)) of (A) component to (B) component ranges from 50/50 to 80/20 in a mass ratio and a content of (C) component ranges from 0.1 part to 20 parts with respect to 100 parts by mass of a sum of (A) component and (B) component, and the golf ball resin composition has a melt flow rate (190° C., 2.16 kg) of 5 g/10 min or more.

(A) The ternary ionomer resin mainly contained in the golf ball resin composition of the present invention is soft and thus improves the shot feeling of the resultant golf ball. Further, (B) the binary copolymer composed of an olefin and an $\alpha,\beta$-unsaturated carboxylic acid having 3 to 8 carbon atoms and/or a ternary copolymer composed of an olefin, an $\alpha,\beta$-unsaturated carboxylic acid having 3 to 8 carbon atoms and an $\alpha,\beta$-unsaturated carboxylic acid ester improves the fluidity of the golf ball resin composition. (C) The zinc compound is used to neutralize non-neutralized carboxyl groups existing in (A) component and (B) component, thereby improving a resilience of the resin composition. Since (C) the zinc compound with a relatively slow neutralization rate is used, the neutralization does not proceed so much in a melt-mixing step or an extruding step of the golf ball resin composition. Thus, the golf ball resin composition maintains a good fluidity. Since the neutralization proceed in a step of molding in a mold, the resultant golf ball resin composition has as high resilience as the ionomer resin having a high neutralization degree. Consequently, the golf ball resin composition of the present invention enables to strike a balance between the fluidity and resilience.

The present invention includes the golf ball resin composition before carboxyl groups existing in (A) component and (B) component are neutralized with (C) the zinc compound, and the golf ball resin composition after the neutralization proceeded. It is noted that the golf ball resin composition after the neutralization proceeded includes the composition after the neutralization proceeded partially. In the present invention, the golf ball resin composition before neutralization may be referred to as "non-neutralized golf ball resin composition," and the golf ball resin composition after neutralization may be referred to as "neutralized golf ball resin composition," respectively. Simply referred "golf ball resin composition" includes both embodiments, unless otherwise described.

The present invention further provides a golf ball having a constituent member formed by injection molding the golf ball resin composition of the present invention. The constituent member preferably includes an intermediate layer. In this case, the intermediate layer preferably has a thickness ranging from 0.5 mm to 1.3 mm.

According to the present invention, the soft golf ball resin composition containing an ionomer resin with an excellent resilience and fluidity is obtained. According to the present invention, the golf ball with an excellent shot feeling, flight distance, and durability is obtained.

BRIEF DESCRIPTION OF THE DRAWINGS

FIG. 1 is a FT-IR spectrum of one embodiment of the golf ball resin composition of the present invention.

DESCRIPTION OF THE PREFERRED EMBODIMENT

The present invention provides a golf ball resin composition comprising (A) an ionomer resin consisting of a metal ion-neutralized product of a ternary copolymer composed of an olefin, an $\alpha,\beta$-unsaturated carboxylic acid having 3 to 8 carbon atoms, and an $\alpha,\beta$-unsaturated carboxylic acid ester; (B) a binary copolymer composed of an olefin and an $\alpha,\beta$-unsaturated carboxylic acid having 3 to 8 carbon atoms and/or a ternary copolymer composed of an olefin, an $\alpha,\beta$-unsaturated carboxylic acid having 3 to 8 carbon atoms, and an $\alpha,\beta$-unsaturated carboxylic acid ester, and (C) a zinc compound, wherein a content ratio ((A)/(B)) of (A) component to (B) component ranges from 50/50 to 80/20 in a mass ratio and a content of (C) component ranges from 0.1 part to 20 parts with respect to 100 parts by mass of a sum of (A) component and (B) component, and the golf ball resin composition has a melt flow rate (190° C., 2.16 kg) of 5 g/10 min or more.

First, (A) the ionomer resin consisting of a metal ion-neutralized product of a ternary copolymer composed of an olefin, an $\alpha,\beta$-unsaturated carboxylic acid having 3 to 8 carbon atoms, and an $\alpha,\beta$-unsaturated carboxylic acid ester (hereinafter, sometimes merely referred to as "ternary ionomer resin") will be explained. (A) The ionomer resin includes, for example, one prepared by neutralizing at least a part of carboxyl groups in a ternary copolymer composed of an olefin, an $\alpha,\beta$-unsaturated carboxylic acid having 3 to 8 carbon atoms, and an $\alpha,\beta$-unsaturated carboxylic acid ester with a metal ion. The olefin preferably includes an olefin having 2 to 8 carbon atoms. Examples of the olefin are ethylene, propylene, butene, pentene, hexene, heptene, and octene. The olefin more preferably includes ethylene. Examples of the $\alpha,\beta$-unsaturated carboxylic acid having 3 to 8 carbon atoms are acrylic acid, methacrylic acid, fumaric acid, maleic acid and crotonic acid. Among these, acrylic acid and methacrylic acid are particularly preferred. Examples of the $\alpha,\beta$-unsaturated carboxylic acid ester include methyl ester, ethyl ester, propyl ester, n-butyl ester, isobutyl ester of acrylic acid, methacrylic acid, fumaric acid, maleic acid or the like. In particular, acrylic acid ester and methacrylic acid ester are preferable. Among them, as (A) the ternary ionomer resin, preferred is the metal ion-neutralized product of the ternary copolymer composed of ethylene-(meth)acrylic acid-(meth)acrylic acid ester. Herein, "(meth)acrylic acid" means acrylic acid and/or methacrylic acid.

The content of the $\alpha,\beta$-unsaturated carboxylic acid having 3 to 8 carbon atoms in (A) the ternary ionomer resin is preferably 2 mass % or more, more preferably 3 mass % or more, and is preferably 30 mass % or less, more preferably 25 mass % or less.

The degree of neutralization of the carboxyl groups contained in (A) the ternary ionomer resin is preferably 20 mole % or more, more preferably 30 mole % or more, and is preferably 90 mole % or less, more preferably 85 mole % or less. If the degree of neutralization is 20 mole % or more, the resultant constituent member formed from the golf ball resin composition of the present invention has better resilience and durability. If the degree of neutralization is 90 mole % or less, the golf ball resin composition has better fluidity (good moldability). The degree of neutralization of the carboxyl groups in the ionomer resin can be calculated by the following expression.

Degree of neutralization (mol %) of the ionomer resin=(the number of moles of carboxyl groups neutralized in the ionomer resin/the number of moles of all carboxyl groups contained in the ionomer resin)×100

Examples of a metal (ion) used for neutralizing at least a part of carboxyl groups of (A) the ternary ionomer resin include: monovalent metals ions such as sodium, potassium, lithium, or the like; divalent metals ions such as magnesium, calcium, zinc, barium, cadmium, or the like; trivalent metals ions such as aluminum or the like; and other metals (ions) such as tin, zirconium, or the like. (A) The ternary ionomer resin used in the present invention is preferably neutralized with zinc. Use of (A) the ternary ionomer resin neutralized with zinc provides a golf ball with a good durability and low temperature durability.

Specific examples of the ternary ionomer resin include trade name "Himilan (registered trademark) (e.g. Himilan AM7327 (Zn), Himilan 1855 (Zn), Himilan 1856 (Na), Himilan AM7331 (Na), or the like)" commercially available from Du Pont-Mitsui Polychemicals Co., Ltd. Further, the ternary ionomer resins commercially available from E.I. du Pont de Nemours and Company include trade name "Surlyn (registered trademark) (e.g. Surlyn 6320 (Mg), Surlyn 8120 (Na), Surlyn 8320 (Na), Surlyn 9320 (Zn), Surlyn 9320W (Zn) or the like)". Further, ionomer resins commercially available from ExxonMobil Chemical Corporation include trade name "Iotek (registered trademark) (e.g. Iotek 7510 (Zn), Iotek 7520 (Zn) or the like)". It is noted that Na, Zn, Li, and Mg described in the parentheses after the trade names indicate metal types of neutralizing metal ions. The ternary ionomer resins may be used alone or as a mixture of at least two of them.

(A) The ternary ionomer resin preferably has a bending stiffness of 10 MPa or more, more preferably 11 MPa or more, even more preferably 12 MPa or more, and preferably has a bending stiffness of 100 MPa or less, more preferably 97 MPa or less, even more preferably 95 MPa or less. If the bending stiffness of (A) the ternary ionomer resin is too low, the flight distance tends to be shorter because of the increased spin rate on driver shots. If the bending stiffness is too high, the durability of the golf ball may be lowered.

The melt flow rate (190° C., 2.16 kg) of (A) the ternary ionomer resin is preferably 0.1 g/10 min or more, more preferably 0.3 g/10 min or more, and even more preferably 0.5 g/10 min or more, and is preferably 20 g/10 min or less, more preferably 15 g/10 min or less, even more preferably 10 g/10 min or less. If the melt flow rate of (A) the ternary ionomer resin is 0.1 g/10 min or more, the golf ball resin composition has better fluidity, and for example, it is easy to mold a thin layer. If the melt flow rate of (A) the ternary ionomer resin is 20 g/10 min or less, the durability of the resultant golf ball becomes better.

(A) The ternary ionomer resin preferably has a slab hardness of 20 or more, more preferably 25 or more, even more preferably 30 or more, and preferably has a slab hardness of 70 or less, more preferably 65 or less, even more preferably 60 or less in Shore D hardness. If the ternary ionomer resin has a slab hardness of 20 or more in Shore D hardness, the resultant layer does not become excessively soft and thus the golf ball has higher resilience. If the ternary ionomer resin has a slab hardness of 70 or less in Shore D hardness, the resultant layer does not become excessively hard and thus the golf ball has better durability.

Next, (B) the binary copolymer composed of an olefin and an $\alpha,\beta$-unsaturated carboxylic acid having 3 to 8 carbon atoms, and/or the ternary copolymer composed of an olefin, an $\alpha,\beta$-unsaturated carboxylic acid having 3 to 8 carbon atoms, and an $\alpha,\beta$-unsaturated carboxylic acid ester will be explained. In the present invention, (B) the binary copolymer composed of an olefin and an $\alpha,\beta$-unsaturated carboxylic acid having 3 to 8 carbon atoms, and/or the ternary copolymer composed of an olefin, an $\alpha,\beta$-unsaturated carboxylic acid having 3 to 8 carbon atoms, and an $\alpha,\beta$-unsaturated carboxylic acid ester is sometimes merely referred to as "binary/ternary copolymer." The binary copolymer composed of an olefin and an $\alpha,\beta$-unsaturated carboxylic acid having 3 to 8 carbon atoms is sometimes merely referred to as "binary copolymer." The ternary copolymer composed of an olefin and an $\alpha,\beta$-unsaturated carboxylic acid having 3 to 8 carbon atoms, and an $\alpha,\beta$-unsaturated carboxylic acid ester is sometimes merely referred to as "ternary copolymer." The binary/ternary copolymer enhances the fluidity of the golf ball resin composition.

The binary copolymer is a nonionic copolymer of an olefin and an $\alpha,\beta$-unsaturated carboxylic acid having 3 to 8 carbon atoms wherein the carboxyl groups thereof are not neutralized. The ternary copolymer is a nonionic copolymer of an olefin, an $\alpha,\beta$-unsaturated carboxylic acid having 3 to 8 carbon atoms, and an $\alpha,\beta$-unsaturated carboxylic acid ester wherein the carboxyl groups thereof are not neutralized. Examples of the olefin, $\alpha,\beta$-unsaturated carboxylic acid having 3 to 8 carbon atoms, and $\alpha,\beta$-unsaturated carboxylic acid ester include the same olefin, $\alpha,\beta$-unsaturated carboxylic acid having 3 to 8 carbon atoms, and $\alpha,\beta$-unsaturated carboxylic acid ester exemplified as constituents of "(A) the ternary ionomer resin." The binary copolymer used in the present invention preferably includes a binary copolymer composed of ethylene and (meth)acrylic acid. The ternary copolymer used in the present invention preferably includes a ternary copolymer composed of ethylene, (meth)acrylic acid, and (meth)acrylic acid ester.

The content of the $\alpha,\beta$-unsaturated carboxylic acid having 3 to 8 carbon atoms component in the binary/ternary copolymer is preferably 4 mass % or more, more preferably 5 mass % or more, and is preferably 25 mass % or less, more preferably 20 mass % or less.

The melt flow rate (190° C., 2.16 kg) of (B) the binary/ternary copolymer is preferably 5 g/10 min or more, more preferably 10 g/10 min or more, and even more preferably 15 g/10 min or more, and is preferably 1,700 g/10 min or less, more preferably 1,500 g/10 min or less, even more preferably 1,300 g/10 min or less. If the melt flow rate (190° C., 2.16 kg) of (B) the binary/ternary copolymer is 5 g/10 min or more, the golf ball resin composition has better fluidity, and thus it is easier to mold a thin cover. If the melt flow rate (190° C., 2.16 kg) of (B) the binary/ternary copolymer is 1,700 g/10 min or less, the resultant golf ball has better durability.

Specific examples of the binary copolymer include an ethylene-methacrylic acid copolymer such as "NUCREL (registered trademark) (e.g. NUCREL N1050H, NUCREL N2050H, NUCREL AN4318, NUCREL N1110H, NUCREL N0200H) manufactured by Du Pont-Mitsui Polychemicals Co, and an ethylene-acrylic acid copolymer such as "PRIMA- CORE (registered trademark) 5980I" available from Dow Chemical Company. Specific examples of the ternary copolymer include "NUCREL (registered trademark) (e.g. NUCREL AN4318, NUCREL AN4319) manufactured by Du Pont-Mitsui Polychemicals Co, and "NUCREL (registered trademark) (e.g. NUCREL AE) manufactured by E.I. du Pont de Nemours and Company, and "PRIMACORE (registered trademark) (e.g. PRIMCOR AT310, PRIMCOR AT320) available from Dow Chemical Company.

Next, (C) the zinc compound will be explained. (C) The zinc compound is used to neutralize non-neutralized carboxyl groups existing in (A) component and (B) component, thereby improving the resilience of the resin composition. Since (C) the zinc compound with a relatively slow neutralization rate is used, the neutralization does not proceed so much in a melt-mixing step or an extruding step of the golf ball resin composition. Thus, the golf ball resin composition maintains a good fluidity. Since the neutralization proceed in a step of molding in a mold, the resultant golf ball resin composition has as high a resilience as the ionomer resin having a high neutralization degree. Examples of (C) the zinc compounds are an oxide (zinc oxide), a hydroxide (zinc hydroxide), a sulfide (zinc sulfide), a phosphide, a halide (zinc fluoride, zinc chloride, zinc bromide, zinc iodide), a salt of an oxoacid (zinc sulfate, zinc carbonate, zinc phosphate), an organic zinc compound (dimethylzinc, diphenylzinc, etc), and a complex compound, in addition to a zinc powder. Among them, as (C) the zinc compound, preferred is zinc oxide (ZnO), zinc hydroxide ($Zn(OH)_2$), or zinc carbonate ($ZnCO_3$). These zinc compounds can neutralize (B) the binary/ternary copolymer without lowering the fluidity of the golf ball resin composition. (C) The zinc compound, without limitation, preferably has shapes such as a granular form, plate-like form, needle-like form, and a tetra pod form (for example, "Pana-tetra" available from AMTEC. Co., Ltd.). It is noted that the zinc oxide is used as a pigment or a specific gravity adjusting agent for the cover, but the surface of the zinc oxide for use in the pigment or the specific gravity adjusting agent is often treated in order to improve the dispersibility to the resin. On the other hand, the zinc oxide used in the present invention is preferably not surface-treated or slightly surface-treated in order to enhance the neutralization ability.

If the golf ball resin composition before injection molding is analyzed with FT-IR (Fourier transform infrared spectrophotometer), A1 is defined as an area under a peak around 1600 $cm^{-1}$ and B1 is defined as an area under a peak around 1700 $cm^{-1}$ in the obtained spectrum and P1 is defined by the following equation; $P1=A1/(A1+B1)$. P1 is preferably 0.3 or more, more preferably 0.31 or more, and is preferably 1.0 or less, more preferably 0.99 or less. If P1 falls within the above range, the golf ball resin composition has a good fluidity at the injection molding. In the equation, A1 corresponds to an area under the peak attributed to the neutralized carboxyl group, and B1 corresponds to an area under the peak attributed to the non-neutralized carboxyl group. P1 is defined as a ratio of the neutralized carboxyl groups to the whole carboxyl groups and indicates a degree of neutralization of the golf ball resin composition.

If the golf ball resin composition after injection molding is analyzed with FT-IR (Fourier transform infrared spectrophotometer), A2 is defined as an area under a peak around 1600 $cm^{-1}$ and B2 is defined as an area under a peak around 1700 $cm^{-1}$ in the obtained spectrum and P2 is defined by the following equation; $P2=A2/(A2+B2)$. P2 is preferably 0.3 or more, more preferably 0.31 or more, and is preferably 1.0 or less, more preferably 0.99 or less. If P2 falls within the above range, the golf ball resin composition has a good resilience. In the equation, A2 corresponds to an area under the peak attributed to the neutralized carboxyl group, and B2 corresponds to an area under the peak attributed to the non-neutralized carboxyl group. P2 is defined as a ratio of the neutralized carboxyl groups to the whole carboxyl groups and indicates a degree of neutralization of the golf ball resin composition.

P2/P1 is preferably 1.1 or more, more preferably 1.2 or more, even more preferably 1.3 or more and is preferably 2.5 or less, more preferably 2.4 or less, even more preferably 2.3 or less. P2/P1 indicates a change in the degree of the neutralization of the golf ball before and after the injection molding. If P2/P1 is equal to or more than the lower limit, the effect of improving the resilience by the neutralization with the zinc compound becomes large, while if P2/P1 is equal to or less than the upper limit, the neutralization does not proceed excessively. Thus, the golf ball resin composition maintains the fluidity and the injection molding becomes easy.

In the golf ball resin composition, a content ratio (A)/(B) of (A) the ternary ionomer resin to (B) the binary/ternary copolymer preferably ranges from 50/50 to 80/20, more preferably from 55/45 to 75/25, even more preferably 60/40 to 70/30 in a mass ratio. If the content ratio (A)/(B) of (A) component to (B) component falls within the above range, it becomes easier to strike a balance between the high hardness and high fluidity.

The content of (C) the zinc compound contained in the golf ball resin composition of the present invention is preferably 0.1 part by mass or more, more preferably 0.2 part by mass or more, even more preferably 0.5 part by mass or more, and is preferably 20 parts by mass or less, more preferably 15 parts by mass or less, even more preferably 10 parts by mass or less with respect to 100 parts by mass of a sum of (A) component and (B) component. If the content of (C) the zinc compound is 0.1 part by mass or more with respect to 100 parts by mass of a sum of (A) component and (B) component, the durability of the obtained golf ball improves. On the other hand, if the content of (C) the zinc compound is 20 parts by mass or less with respect to 100 parts by mass of a sum of (A) component and (B) component, the golf ball resin composition can ensure the fluidity.

In the present invention, the golf ball resin composition may further contain a pigment component such as a white pigment (for example, titanium oxide), a blue pigment or the like; a specific gravity adjusting agent; a dispersant; an antioxidant; an ultraviolet absorber; a light stabilizer; a fluorescent material; a fluorescent brightener; or the like, as long as they do not impair the effect of the present invention. In the golf ball resin composition, a fatty acid and/or a metal salt thereof may be used in combination as a fluidity improving agent to the extent that the effect of the present invention does not deteriorate. However, it is not preferable that the low molecular materials such as the fatty acid and/or the metal salt thereof are used in combination, because the low molecular materials causes low mechanical properties.

The amount of the white pigment (for example, titanium oxide), with respect to 100 parts by mass of the resin component, is preferably 0.5 part by mass or more, more preferably 1 part by mass or more, and is preferably 10 parts by mass or less, more preferably 8 parts by mass or less. If the amount of the white pigment is 0.5 parts by mass or more, it is possible to impart the opacity to the constituent member of the golf ball. If the amount of the white pigment is more than 10 parts by mass, the durability of the constituent member of the golf ball may deteriorate.

The golf ball resin composition of the present invention preferably consists of (A) the ternary ionomer resin and (B)

the binary/ternary copolymer as a resin component, but may further contain another thermoplastic elastomer or another thermoplastic resin to the extent that the effect of the present invention does not deteriorate. In this case, the total content of (A) the ternary ionomer resin and (B) the binary/ternary copolymer in the resin component of the golf ball resin composition is preferably 50 mass % or more, more preferably 70 mass % or more, even more preferably 90 mass % or more.

Examples of other thermoplastic elastomers are a thermoplastic polyamide elastomer having a commercial name of "Pebax (registered trademark) (e.g. "Pebax 2533")" commercially available from Arkema K.K.; a polyurethane elastomer having a commercial name of "Elastollan (registered trademark) (e.g. "Elastollan XNY85A")" commercially available from BASF Japan Ltd; a thermoplastic polyester elastomer having a commercial name of "Hytrel (registered trademark) (e.g. "Hytrel 3548", "Hytrel 4047")" commercially available from Du Pont-Toray Co., Ltd.; a thermoplastic polystyrene elastomer having a commercial name of "Rabalon (registered trademark) (e.g. "Rabalon T3221C")" commercially available from Mitsubishi Chemical Corporation. Examples of the thermoplastic resin include an ionomer resin of the binary copolymer composed of an olefin, and $\alpha,\beta$-unsaturated carboxylic acid having 3 to 8 carbon atoms.

The golf ball resin composition of the present invention can be obtained, for example, by dry blending (A) the ternary ionomer resin, (B) the binary/ternary copolymer, and (C) the zinc compound. The dry blended mixture may be extruded in the form of pellet. The dry blending may be carried out using, for example, a mixer capable of blending a raw material in the form of pellet, more preferably a tumbler type mixer. Extruding can be carried out by publicly known extruders such as a single-screw kneading extruder, a twin-screw kneading extruder, and a twin-single kneading extruder. The extruding condition is not particularly limited. For example, in the case of extruding with a twin-screw kneading extruder, the preferable conditions are screw diameter=45 mm; screw revolutions=50 rpm to 400 rpm; screw L/D=35, and cylinder temperature; 140° C. to 200° C. If the extruding temperature exceeds 200° C., the neutralization proceeds and the fluidity may be lowered.

The melt flow rate (190° C., 2.16 kg) of the golf ball resin composition of the present invention is preferably 5 g/10 min or more, more preferably 6 g/10 min or more, and is preferably 100 g/10 min or less, more preferably 75 g/10 min or less, even more preferably 50 g/10 min or less. If the melt flow rate of the golf ball resin composition falls within the above range, it is easier to mold the golf ball resin composition into a thin layer.

The golf ball resin composition of the present invention preferably has a slab hardness of 35 or more, more preferably 36 or more, even more preferably 37 or more, and preferably has a slab hardness of 55 or less, more preferably 54 or less, even more preferably 53 or less in Shore D hardness. If the slab hardness of the golf ball resin composition is 35 or more in Shore D hardness, the stiffness becomes high and thus the golf ball with excellent resilience (flight distance) is obtained. On the other hand, if the slab hardness of the golf ball resin composition is 55 or less in Shore D hardness, the shot feeling and durability of the obtained golf ball are further improved. Herein, the slab hardness of the golf ball resin composition is a measured hardness of the golf ball resin composition that is molded into a sheet form by a measuring method described later.

The golf ball of the present invention is not limited, as long as it comprises a constituent member formed from the golf ball resin composition of the present invention. For example, in a two-piece golf ball comprising a single-layered core and a cover disposed around the core, in a three-piece golf ball comprising a core having a center and a single-layered intermediate layer disposed around the center, and a cover disposed around the core, and in a multi-piece golf ball comprising a core having a center and at least one intermediate layer disposed around the center, and a cover disposed around the core (including the three-piece golf ball mentioned above), anyone of constituent members is formed from the above golf ball resin composition. In one preferable embodiment, the intermediate layer is formed from the above golf ball resin composition.

In the followings, the present invention will be explained based on the preferable golf ball that comprises a core having a center and at least one intermediate layer disposed around the center and a cover disposed around the core, wherein at least one of the intermediate layer is formed from the above golf ball resin composition. However, the present invention is not limited to this embodiment.

The core of the golf ball of the present invention preferably includes, for example, a multi-layered core having a center and at least one intermediate layer covering the center. The core preferably has a spherical shape. If the core does not have a spherical shape, the cover does not have a uniform thickness. As a result, there exist some portions where the performance of the cover is lowered.

On the other hand, the center generally has the spherical shape, but the center may be provided with a rib on the surface thereof so that the surface of the spherical center is divided by the ribs. For example, the surface of the spherical center is evenly divided by the ribs. In one embodiment, the ribs are preferably formed on the surface of the spherical center in an integrated manner, and in another embodiment, the ribs are formed as an intermediate layer on the surface of the spherical center. The ribs are preferably formed along an equatorial line and meridians that evenly divide the surface of the spherical center, if the spherical center is assumed as the earth. For example, if the surface of the spherical center is evenly divided into 8, the ribs are formed along the equatorial line, any meridian as a standard, and meridians at the longitude 90 degrees east, longitude 90 degrees west, and the longitude 180 degrees east(west), assuming that the meridian as the standard is at longitude 0 degree. If the ribs are formed, the depressed portion divided by the ribs are preferably filled with a plurality of intermediate layers or with a single-layered intermediate layer that fills each of the depressed portions to make a core in the spherical shape. The shape of the ribs, without limitation, includes an arc or an almost arc (for example, a part of the arc is removed to obtain a flat surface at the cross or orthogonal portions thereof).

A conventionally known rubber composition (hereinafter, sometimes simply referred to as "center rubber composition") may be employed for the center of the golf ball of the present invention, and the center can be molded by, for example, heat-pressing a rubber composition containing a base rubber, a crosslinking initiator, a co-crosslinking agent, and a filler.

As the base rubber, a natural rubber and/or a synthetic rubber may be used. Examples of the base rubber are a polybutadiene rubber, a natural rubber, a polyisoprene rubber, a styrene polybutadiene rubber, and ethylene-propylene-diene terpolymer (EPDM). Among them, typically preferred is the high cis-polybutadiene having cis-1,4-bond in a proportion of 40% or more, more preferably 70% or more, even more preferably 90% or more in view of its superior resilience property.

The crosslinking initiator is blended to crosslink the base rubber component. As the crosslinking initiator, an organic peroxide is preferably used. Examples of the organic peroxide for use in the present invention are dicumyl peroxide, 1,1-bis (t-butylperoxy)-3,5-trimethylcyclohexane, 2,5-dimethyl-2,5-di(t-butylperoxy) hexane, and di-t-butyl peroxide. Among them, dicumyl peroxide is preferable. An amount of the crosslinking initiator to be blended in the rubber composition is preferably 0.3 part by mass or more, more preferably 0.4 part by mass or more, and is preferably 5 parts by mass or less, more preferably 3 parts by mass or less based on 100 parts by mass of the base rubber. If the amount is less than 0.3 part by mass, the center becomes too soft, and the resilience tends to be lowered, and if the amount is more than 5 parts by mass, the amount of the co-crosslinking agent must be increased in order to obtain the appropriate hardness, which tends to cause the insufficient resilience.

The co-crosslinking agent is not particularly limited, as long as it serves to crosslink a rubber molecule by graft polymerization to a base rubber molecular chain; for example, $\alpha,\beta$-unsaturated carboxylic acid having 3 to 8 carbon atoms or a metal salt thereof, more preferably acrylic acid, methacrylic acid or a metal salt thereof may be used. As the metal constituting the metal salt, for example, zinc, magnesium, calcium, aluminum and sodium may be used, and among them, zinc is preferred because it provides high resilience.

The amount of the co-crosslinking agent to be used is preferably 10 parts or more, more preferably 15 parts or more, even more preferably 20 parts or more, and is preferably 55 parts or less, more preferably 50 parts or less, even more preferably 48 parts or less, based on 100 parts of the base rubber by mass. If the amount of the co-crosslinking agent to be used is less than 10 parts by mass, the amount of the crosslinking initiator must be increased to obtain an appropriate hardness, which tends to lower the resilience. On the other hand, if the amount of the co-crosslinking agent to be used is more than 55 parts by mass, the center becomes too hard, so that the shot feeling may be lowered.

The filler contained in the center rubber composition is mainly blended as a specific gravity adjusting agent in order to adjust the specific gravity of the golf ball obtained as the final product, and may be blended as required. Examples of the filler include an inorganic filler such as zinc oxide, barium sulfate, calcium carbonate, magnesium oxide, tungsten powder, and molybdenum powder. The amount of the filler to be blended in the rubber composition is preferably 0.5 part or more, more preferably 1 part or more, and is preferably 30 parts or less, more preferably 20 parts or less based on 100 parts of the base rubber by mass. If the amount of the filler to be blended is less than 0.5 part by mass, it becomes difficult to adjust the weight, while if it is more than 30 parts by mass, the weight ratio of the rubber component becomes small and the resilience tends to be lowered.

As the center rubber composition, an organic sulfur compound, an antioxidant or a peptizing agent may be blended appropriately in addition to the base rubber, the crosslinking initiator, the co-crosslinking agent and the filler.

As the organic sulfur compound, diphenyl disulfide or a derivative thereof may be preferably used. Examples of the diphenyl disulfide or the derivative thereof include diphenyl disulfide; mono-substituted diphenyl disulfide such as bis(4-chlorophenyl) disulfide, bis(3-chlorophenyl) disulfide, bis(4-bromophenyl) disulfide, bis(3-bromophenyl) disulfide, bis(4-fluorophenyl) disulfide, bis(4-iodophenyl) disulfide and bis(4-cyanophenyl) disulfide; di-substituted diphenyl disulfide such as bis(2,5-dichlorophenyl) disulfide, bis(3,5-dichlorophenyl) disulfide, bis(2,6-dichlorophenyl) disulfide, bis(2,5-dibromophenyl) disulfide, bis (3,5-dibromophenyl) disulfide, bis(2-chloro-5-bromophenyl) disulfide, and bis(2-cyano-5-bromophenyl) disulfide; tri-substituted diphenyl disulfide such as bis (2,4,6-trichlorophenyl) disulfide, and bis(2-cyano-4-chloro-6-bromophenyl) disulfide; tetra-substituted diphenyl disulfide such as bis(2,3,5,6-tetra chlorophenyl) disulfide; penta-substituted diphenyl disulfide such as bis(2,3,4,5,6-pentachlorophenyl) disulfide and bis(2,3,4,5,6-pentabromophenyl) disulfide. These diphenyl disulfides or the derivative thereof can enhance resilience by having some influence on the state of vulcanization of vulcanized rubber. Among them, diphenyl disulfide or bis(pentabromophenyl) disulfide is preferably used since the golf ball having particularly high resilience can be obtained. The amount of the diphenyl disulfide or the derivative thereof to be blended is preferably 0.1 part by mass or more, more preferably 0.3 part by mass or more, and is preferably 5.0 parts by mass or less, more preferably 3.0 parts by mass or less relative to 100 parts by mass of the base rubber.

The amount of the antioxidant to be blended is preferably 0.1 part or more and is preferably 1 part or less based on 100 parts of the base rubber by mass. Further, the amount of the peptizing agent is preferably 0.1 part or more and is preferably 5 parts or less based on 100 parts of the base rubber by mass.

The center can be obtained by mixing, kneading the above mentioned rubber composition and molding the rubber composition in the mold. The conditions for press-molding the center rubber composition should be determined depending on the rubber composition. Specifically, the press-molding is preferably carried out for 10 to 60 minutes at the temperature of 130° C. to 200° C. under the pressure from 2.9 MPa to 11.8 MPa. Alternatively, the press-molding is preferably carried out in a two-step heating, for example, for 20 to 40 minutes at the temperature of 130° C. to 150° C., and continuously for 5 to 15 minutes at the temperature of 160° C. to 180° C.

The diameter of the center is preferably 34.8 mm or more, more preferably 35.0 mm or more, and even more preferably 35.2 mm or more, and is preferably 41.2 mm or less, more preferably 41.0 mm or less, and even more preferably 40.8 mm or less. If the diameter of the center is 34.8 mm or more, the intermediate layer or the cover layer does not become excessively thick, and hence the resilience of the golf ball becomes good. On the other hand, if the diameter of the center is 41.2 mm or less, the intermediate layer or the cover does not become excessively thin, and hence the intermediate layer or the cover functions better.

When the center has a diameter from 34.8 mm to 41.2 mm, a compression deformation amount (shrinking deformation amount of the center along the compression direction) of the center when applying a load from 98 N as an initial load to 1275 N as a final load is preferably 1.90 mm or more, more preferably 2.00 mm or more, even more preferably 2.10 mm or more, and is preferably 4.00 mm or less, more preferably 3.90 mm or less, even more preferably 3.80 mm or less. If the compression deformation amount is 1.90 mm or more, the shot feeling becomes good, while if the compression deformation amount is 4.00 mm or less, the resilience becomes better.

The surface hardness of the center is preferably 45 or larger, more preferably 50 or larger, and even more preferably 55 or larger, and is preferably 65 or smaller, more preferably 62 or smaller, and even more preferably 60 or smaller in shore D hardness. If the surface hardness is 45 or more in Shore D hardness, the center does not become excessively soft and the resilience becomes good. If the surface hardness of the center is 65 or less in Shore D hardness, the center does not become so hard and the shot feeling becomes good.

In one preferable embodiment, the intermediate layer is, for example, formed by covering the center with the golf ball resin composition (hereinafter, sometimes merely referred to as "intermediate layer composition"). An embodiment for molding the intermediate layer is not particularly limited, and includes an embodiment which comprises injection molding the intermediate layer composition directly onto the center, or an embodiment which comprises molding the intermediate layer composition into a half hollow-shell, covering the center with the two half hollow-shells, and subjecting the center with the two half hollow-shells to the compression-molding at the temperature of 130° C. to 170° C. for 1 min to 5 mins. The intermediate layer of the golf ball of the present invention is preferably formed by injection molding. The intermediate layer can be produced more easily by injection molding.

In the case of directly injection molding the intermediate layer composition onto the center, it is preferred to use upper and lower molds for forming the intermediate layer having a spherical cavity and pimples, wherein a part of the pimple also serves as a retractable hold pin. When forming the intermediate layer by injection molding, the hold pin is protruded to hold the center, and the intermediate layer composition which has been heated and melted is charged and then cooled to obtain the intermediate layer.

In the case of molding the intermediate layer using the injection molding apparatus provided with an injection unit and a mold unit, a temperature (setting temperature of the injection unit) at the cylinder (barrel) portion of the injection unit is preferably 200° C. or more, more preferably 210° C. or more, and is preferably 270° C. or less, more preferably 260° C. or less. If the temperature of the cylinder (barrel) portion falls within the above range, the golf ball resin composition can maintain the fluidity and the neutralization of non-neutralized carboxyl groups existing in (A) component and (B) component with (C) the zinc compound proceeds.

When molding the intermediate layer in a compression molding method, molding of the half shell can be performed by either compression molding method or injection molding method, and the compression molding method is preferred. The compression-molding of the intermediate layer composition into half shell can be carried out, for example, under a pressure of 1 MPa or more and 20 MPa or less at a temperature of −20° C. or more and 70° C. or less relative to the flow beginning temperature of the intermediate layer composition. By performing the molding under the above conditions, a half shell having a uniform thickness can be formed. Examples of a method for molding the intermediate layer using half shells include compression molding by covering the center with two half shells. The compression molding of half shells into the intermediate layer can be carried out, for example, under a pressure of 0.5 MPa or more and 25 MPa or less at a temperature of −20° C. or more and 70° C. or less relative to the flow beginning temperature of the intermediate layer composition. By performing the molding under the above conditions, the intermediate layer having a uniform thickness can be formed.

The molding temperature means the highest temperature where the temperature at the surface of the concave portion of the lower mold reaches from closing through opening the molds. Further, the flow beginning temperature of the intermediate layer composition can be measured in a pellet form under the following conditions by using a flow characteristics evaluation apparatus (Flow Tester CFT-500, manufactured by Shimadzu Corporation).

Measuring conditions: Area size of a plunger: 1 $cm^2$, Die length: 1 mm, Die diameter: 1 mm, Load: 588.399 N, Start temperature: 30° C., and Temperature increase rate: 3° C./min.

The thickness of the intermediate layer is preferably 1.3 mm or less, more preferably 1.2 mm or less, and even more preferably 1.1 mm or less. If the thickness of the intermediate layer is 1.3 mm or less, the resilience and shot feeling of the golf ball are improved. The thickness of the intermediate layer is preferably 0.5 mm or more, more preferably 0.6 mm or more, even more preferably 0.7 mm or more. If the thickness of the intermediate layer is 0.5 mm or more, it is easier to mold the intermediate layer. Further, the durability of the resultant golf ball is enhanced.

The melt flow rate (190° C., 2.16 kg) of the intermediate layer composition is preferably 5 g/10 min or more, more preferably 6 g/10 min or more, and is preferably 100 g/10 min or less, more preferably 75 g/10 min or less, even more preferably 50 g/10 min or less, most preferably 35 g/10 min or less. If the melt flow rate of the intermediate layer composition is 5 g/10 min or more, the moldability is enhanced and thus it is easy to mold the thin-walled intermediate layer.

The intermediate layer composition preferably has a bending stiffness of 30 MPa or more, more preferably 35 MPa or more, even more preferably 40 MPa or more, and preferably has a bending stiffness of 350 MPa or less, more preferably 300 MPa or less, even more preferably 250 MPa or less. If the bending stiffness of the intermediate layer composition is 30 MPa or more, since the obtained golf ball has an outer-hard inner soft structure, the flight distance becomes great. On the other hand, if the bending stiffness is 350 MPa or less, the obtained golf ball becomes appropriately soft and thus the shot feeling becomes good.

The intermediate layer composition preferably has a rebound resilience of 40% or more, more preferably 41% or more, even more preferably 42% or more. If the intermediate layer composition has a rebound resilience of 40% or more, the flight distance of the obtained golf ball becomes great. Herein, the bending stiffness and the rebound resilience of the intermediate layer composition are measured by molding the intermediate layer composition into a sheet form. The method for the measurement is described later.

The intermediate layer composition preferably has a slab hardness of 35 or more, more preferably 36 or more, even more preferably 37 or more, and preferably has a slab hardness of 55 or less, more preferably 54 or less, even more preferably 53 or less in Shore D hardness. If the intermediate layer composition has a slab hardness of 35 or more, the stiffness of the resultant intermediate layer is enhanced, and thus the golf ball excellent in the resilience (flight distance) is obtained. On the other hand, if the intermediate layer composition has a slab hardness of 55 or less, the shot feeling and durability of the resultant golf ball are further enhanced. Herein, the slab hardness of the intermediate layer composition is a measured hardness of the intermediate layer composition that is molded into a sheet form by a measuring method described later.

The melt flow rate, bending stiffness, rebound resilience and the slab hardness of the intermediate layer composition can be adjusted by appropriately selecting kinds, amount or the like of (A) the ternary ionomer resin, (B) the binary/ternary copolymer, and (C) the zinc compound.

In one preferable embodiment that the golf ball of the present invention has at least two intermediate layers, the golf ball may have an intermediate layer which is formed from an intermediate layer composition different from the golf ball resin composition of the present invention, as long as at least one of the intermediate layer is formed from the golf ball resin composition of the present invention. In this case, it is preferred that the outermost layer of the core is an intermediate layer formed from the golf ball resin composition of the present invention, and it is more preferred that all the multi-piece of intermediate layers or multi-layer of intermediate layers are formed from the golf ball resin composition of the present invention.

Examples of the intermediate layer composition which is different from the golf ball resin composition of the present invention include, a thermoplastic polyamide elastomer having a trade name "Pebax (registered trademark) (e.g. "Pebax 2533")" commercially available from Arkema Inc., a thermoplastic polyester elastomer having a trade name "Hytrel (registered trademark) (e.g. "Hytrel 3548" and "Hytrel 4047")" commercially available from Du Pont-Toray Co., Ltd., a thermoplastic polyurethane elastomer having a trade name "Elastollan (registered trademark) (e.g. "Elastollan XNY97A")" commercially available from BASF Japan Ltd., a thermoplastic polystyrene elastomer having a trade name "Rabalon (registered trademark)" commercially available from Mitsubishi Chemical Corporation, and the like, in addition to the center rubber composition described above and the ionomer resin. Further, the intermediate layer composition may contain a specific gravity adjusting agent such as barium sulfate, tungsten, or the like; an antioxidant; a pigment; or the like.

In one preferable embodiment, the diameter of the core of the golf ball is preferably 39.0 mm or more, more preferably 39.5 mm or more, and even more preferably 40.8 mm or more. If the diameter of the core is less than 39.0 mm, the cover becomes excessively thick and hence the resilience of the golf ball may deteriorate. Further, the diameter of the core is preferably 42.2 mm or less, more preferably 42.0 mm or less, and even more preferably 41.8 mm or less. If the diameter of the core is more than 42.2 mm, the thickness of the cover becomes relatively thin, and hence a protection effect of the cover is not obtained sufficiently.

When the core has a diameter from 39.0 mm to 42.2 mm, a compression deformation amount (shrinking deformation amount of the core along the compression direction) of the core when applying a load from 98 N as an initial load to 1275 N as a final load is preferably 1.90 mm or more, more preferably 2.00 mm or more, even more preferably 2.10 mm or more, and is preferably 4.00 mm or less, more preferably 3.90 mm or less, even more preferably 3.80 mm or less. If the compression deformation amount is less than 1.90 mm, the core becomes too hard, resulting in the poor shot feeling, while if the compression deformation amount is more than 4.00 mm, the core becomes too soft, resulting in the heavy shot feeling.

The center hardness of the core is preferably 30 or larger, more preferably 32 or larger, and even more preferably 35 or larger in Shore D hardness. If the center hardness is smaller than 30 in Shore D hardness, the core becomes so soft that the resilience of the golf ball tends to become lower. The center hardness of the core is preferably 50 or smaller, more preferably 48 or smaller, and even more preferably 45 or smaller in Shore D hardness. If the center hardness is more than 50 in Shore D hardness, the core becomes too hard, resulting in the poor shot feeling. In the present invention, the center hardness of the core is the hardness measured with the Shore D type spring hardness tester at the central point of a cut plane of a core which has been cut into two halves.

The surface hardness of the core is preferably 35 or larger, more preferably 37 or larger, and even more preferably 40 or larger in Shore D hardness. If the surface hardness is less than 35 in Shore D hardness, the core becomes so soft and the resilience may be lowered. The surface hardness of the core is preferably 65 or smaller, more preferably 63 or smaller, and even more preferably 60 or smaller in shore D hardness. If the surface hardness is more than 65 in Shore D hardness, the core becomes so hard and the shot feeling may be lowered.

In one preferable embodiment, depending upon the objects, the core having the surface hardness larger than the center hardness, or the core having the center hardness larger than the surface hardness may be used as the core. For example, the surface hardness of the core is easily made larger than or smaller than the center hardness of the core by employing a multi-layered core structure.

In the case of using the relatively hard material for the cover covering the core (for example, the cover composition has a slab hardness of 50 or more in Shore D hardness), the shot feeling is improved by lowering the hardness of the intermediate layer. In the case of using the relatively soft material for the cover covering the core (for example, the cover composition has a slab hardness of less than 50 in Shore D hardness), the high launch angle and low spin rate on the driver shot or the like are achieved by increasing the hardness of the intermediate layer. As a result, the flight distance is improved.

In the case that the core has the surface hardness smaller than the center hardness, the hardness difference (center hardness−surface hardness) between the surface hardness and the center hardness of the core in the golf ball of the present invention is preferably 4 or larger, more preferably 7 or larger in Shore D hardness. If the surface hardness is smaller than the center hardness, the shot feeling of the golf ball is improved. Further, in this case, the hardness difference (center hardness−surface hardness) between the surface hardness and the center hardness of the core in the golf ball of the present invention is preferably 40 or less, more preferably 35 or less. If the hardness difference is too large, the durability of the golf ball may deteriorate.

In the case that the core has the surface hardness larger than the center hardness, the hardness difference (surface hardness−center hardness) between the surface hardness and the center hardness of the core in the golf ball of the present invention is preferably 4 or larger, more preferably 7 or larger in Shore D hardness. If the surface hardness is larger than the center hardness, the launch angle becomes high and the spin rate becomes low, thereby improving the flight distance. Further, in this case, the hardness difference (surface hardness−center hardness) between the surface hardness and the center hardness of the core in the golf ball of the present invention is preferably 40 or less, more preferably 35 or less. If the hardness difference is too large, the durability of the golf ball may deteriorate.

In one preferable embodiment, the cover of the golf ball of the present invention is formed from a cover composition containing a resin component. The resin component includes, for example, a thermoplastic polyamide elastomer having a commercial name of "Pebax (registered trademark) (e.g. "Pebax 2533")" commercially available from Arkema K. K.; a thermoplastic polyester elastomer having a commercial name of "Hytrel (registered trademark) (e.g. "Hytrel 3548", "Hytrel 4047")" commercially available from Du Pont-Toray Co., Ltd.; a thermoplastic polystyrene elastomer having a commercial name of "Rabalon (registered trademark) (e.g. "Rabalon T3221C")" commercially available from Mitsubishi Chemical Corporation, in addition to the polyurethane resin and the ionomer resin. Further, (B) a binary copolymer composed of an olefin and an α,β-unsaturated carboxylic acid having 3 to 8 carbon atoms and/or a ternary copolymer composed of an olefin, an α,β-unsaturated carboxylic acid having 3 to 8 carbon atoms, and an α,β-unsaturated carboxylic acid ester can be used. These resin components are used solely or as a mixture of at least two of them.

In one preferable embodiment, the cover composition preferably contains the polyurethane resin or the ionomer resin, as the resin component. The content of the polyurethane resin or the ionomer resin in the resin component of the cover composition is preferably 50 mass % or more, more preferably 60 mass % or more, even more preferably 70 mass % or more. In more preferable embodiment, the cover composition contains the ionomer resin as the resin component. Since the ionomer resins are used for both of the cover and the intermediate layer, the adhesion between the intermediate layer and the cover will become much higher.

In the present invention, in addition to the aforementioned resin component, the cover composition may further contain a pigment component such as a white pigment (for example, titanium oxide), a blue pigment (for example, ultramarine blue), a red pigment, or the like; a specific gravity adjusting agent such as zinc oxide, calcium carbonate, barium sulfate, or the like; a dispersant; an antioxidant; an ultraviolet absorber; a light stabilizer; a fluorescent material; a fluorescent brightener; or the like, as long as they do not impair the performance of the cover.

The amount of the white pigment (for example, titanium oxide), with respect to 100 parts by mass of the resin component constituting the cover, is preferably 0.5 part by mass or more, more preferably 1 part by mass or more, and is preferably 10 parts by mass or less, more preferably 8 parts by mass or less. If the amount of the white pigment is 0.5 parts by mass or more, it is possible to impart the opacity to the cover. If the amount of the white pigment is more than 10 parts by mass, the durability of the cover may deteriorate.

The cover composition preferably has a slab hardness of 70 or less, more preferably 68 or less, even more preferably 65 or less in Shore D hardness. If the cover composition has a slab hardness of 70 or less, the spin rate on the approach shots with short irons increases. As a result, the golf ball having a good controllability on the approach shots is obtained. In order to ensure the spin rate sufficiently for the approach shots, the cover composition preferably has a slab hardness of 20 or more, more preferably 25 or more, even more preferably 30 or more in Shore D hardness.

An embodiment for molding a cover is not particularly limited, and includes an embodiment which comprises injection molding the cover composition directly onto the core, or an embodiment which comprises molding the cover composition into a hollow-shell, covering the core with a plurality of the hollow-shells and subjecting the core with a plurality of the hollow shells to the compression-molding (preferably an embodiment which comprises molding the cover composition into a half hollow-shell, covering the core with the two half hollow-shells, and subjecting the core with the two half hollow-shells to the compression-molding).

When molding the cover in a compression molding method, molding of the half shell can be performed by either compression molding method or injection molding method, and the compression molding method is preferred. The compression-molding of the cover composition into half shell can be carried out, for example, under a pressure of 1 MPa or more and 20 MPa or less at a temperature of −20° C. or more and 70° C. or less relative to the flow beginning temperature of the cover composition. By performing the molding under the above conditions, a half shell having a uniform thickness can be formed. Examples of a method for molding the cover using half shells include compression molding by covering the core with two half shells. The compression molding of half shells into the cover can be carried out, for example, under a pressure of 0.5 MPa or more and 25 MPa or less at a temperature of −20° C. or more and 70° C. or less relative to the flow beginning temperature of the cover composition. By performing the molding under the above conditions, a golf ball cover having a uniform thickness can be formed.

In the case of directly injection molding the cover composition onto the core, it is preferred to use upper and lower molds for forming a cover having a spherical cavity and pimples, wherein a part of the pimples also serves as a retractable hold pin. When forming the cover by injection molding, the hold pin is protruded to hold the core, and the cover composition which has been heated and melted is charged and then cooled to obtain a cover. For example, the cover composition heated and melted at the temperature of 200° C. to 250° C. is charged into a mold held under the pressure of 9 MPa to 15 MPa for 0.5 to 5 second. After cooling for 10 to 60 seconds, the mold is opened and the golf ball with the cover molded is taken out from the mold.

When molding a cover, the concave portions called "dimple" are usually formed on the surface. The total number of the dimples is preferably 200 or more and 500 or less. If the total number is less than 200, the dimple effect is hardly obtained. On the other hand, if the total number exceeds 500, the dimple effect is hardly obtained because the size of the respective dimples is small. The shape (shape in a plan view) of dimples includes, for example, without limitation, a circle, polygonal shapes such as roughly triangular shape, roughly quadrangular shape, roughly pentagonal shape, and roughly hexagonal shape, another irregular shape. The shape of the dimples is employed solely or in combination at least two of them.

In the present invention, the thickness of the cover of the golf ball is preferably 2.0 mm or less, more preferably 1.6 mm or less, even more preferably 1.2 mm or less, most preferably 1.0 mm or less. If the thickness of the cover is 2.0 mm or less, the resilience and shot feeling of the obtained golf ball become better. The thickness of the cover is preferably 0.1 mm or more, more preferably 0.2 mm or more, and even more preferably 0.3 mm or more. If the thickness of the cover is less than 0.1 mm, it may become difficult to mold the cover. In addition, the durability and the abrasion resistance of the cover may deteriorate.

After the cover is molded, the mold is opened and the golf ball body is taken out from the mold, and as necessary, the golf ball body is preferably subjected to surface treatments such as deburring, cleaning, and sandblast. If desired, a paint film or a mark may be formed. The paint film preferably has a thickness of, but not limited to, 5 μm or larger, and more preferably 7 μm or larger, and preferably has a thickness of 25 μm or smaller, and more preferably 18 μm or smaller. If the thickness is smaller than 5 μm, the paint film is easy to wear off due to continued use of the golf ball, and if the thickness is larger than 25 μm, the effect of the dimples is reduced, resulting in lowering flying performance of the golf ball.

When the golf ball of the present invention has a diameter in a range from 40 mm to 45 mm, a compression deformation amount of the golf ball (an amount of compression of the golf ball in the compression direction thereof) when applying an initial load of 98 N to a final load of 1275 N to the golf ball is preferably 2.0 mm or more, more preferably 2.2 mm or more, and is preferably 4.0 mm or less, more preferably 3.5 mm or less. If the compression deformation amount is 2.0 mm or more, the golf ball does not become excessively hard, and thus exhibits the good shot feeling. On the other hand, if the compression deformation amount is 4.0 mm or less, the resilience is enhanced.

The present invention is explained based on the embodiment where the golf ball resin composition of the present invention is used for the intermediate layer, but the golf ball resin composition of the present invention may be used as the cover composition.

EXAMPLES

Hereinafter, the present invention will be described in detail by way of example. The present invention is not limited to examples described below. Various changes and modifications can be made without departing from the spirit and scope of the present invention.

(1) Hardness of Center and Core (Shore D Hardness)

A type P1 auto loading durometer manufactured by Kobunshi Keiki Co., Ltd., provided with a Shore D type spring hardness tester prescribed in ASTM-D2240 was used to measure the surface hardness and the center hardness of the center and the core. Shore D hardness measured at the surfaces of the center and the core are defined as the surface hardness of the center and the core, respectively. The core was cut into two hemispheres to obtain a cut plane, and a Shore D hardness measured at the central point of the cut plane was used as the center hardness of the core (center).

(2) Slab Hardness (Shore D Hardness)

Sheets with a thickness of about 2 mm were produced by injection molding the cover composition and the intermediate layer composition, and stored at 23° C. for two weeks. Three or more of these sheets were stacked on one another so as not to be affected by the measuring substrate on which the sheets were placed, and the hardness of the stack was measured with a type P1 auto loading durometer manufactured by Kobunshi Keiki Co., Ltd., provided with a Shore D type spring hardness tester prescribed in ASTM-D2240.

(3) Compression Deformation Amount (mm)

A compression deformation amount of the center, core and golf ball (a shrinking amount of the center, core, and golf ball in the compression direction thereof), when applying a load from 98 N as an initial load to 1275 N as a final load to the center, core and golf ball, was measured.

(4) Melt Flow Rate (MFR) (g/10 min)

The MFR was measured using a flow tester (Shimadzu flow tester CFT-100C manufactured by Shimadzu Corporation) in accordance with JIS K7210. The measurement was conducted under the conditions of the measurement temperature 190° C. and the load of 2.16 kg.

(5) Bending Stiffness (MPa)

A sheet with a thickness of about 2 mm was produced by a hot press molding from the intermediate layer composition, and stored at 23° C. for two weeks. The bending stiffness was measured according to JIS K7106. The measurement was conducted under the conditions of the temperature 23° C. and humidity 50RH %.

(6) Shot Feeling

An actual hitting test was carried out by ten amateur golfers (high skilled person) using a driver, and the shot feeling was evaluated according to the following four criteria.

A: Soft
B: Slightly soft (acceptable level)
C: Slightly hard
D: Hard (7) Durability A metal-head driver (W#1) was installed on a swing robot manufactured by TRUETEMPER CO, and the head speed was set to 45 m/sec. Each golf ball was stored in a constant temperature reservoir kept at the temperature of 23° C. for 12 hours. Immediately after taking each golf ball out of the reservoir, they were repeatedly hit with the driver. The number of hits required to break the golf ball was counted. This measurement was conducted by using twelve golf balls for each golf ball. The number of hits for golf ball No. 1 was defined as an index of 100, and the durability of each golf ball was represented by converting the number of hits for each golf ball into this index. A greater index value indicates that the durability of the golf ball is excellent.

(8) Coefficient of Restitution

A 198.4 g of metal cylindrical object was forced to collide with each golf ball at a speed of 40 m/sec, and the speeds of the cylindrical object and the golf ball before and after the collision were measured. Based on these speeds and the mass of each object, coefficient of restitution for each golf ball was calculated. The measurement was conducted by using twelve golf balls for each golf ball, and the average value was regarded as the coefficient of restitution for the golf ball. The coefficient of restitution of golf ball No. 12 was defined as an index of 100.0, and the coefficient of restitution of each golf ball was represented by converting the coefficient of restitution of each golf ball into this index.

(9) FT-IR Measurement

A measuring samples were taken from the pellet of the intermediate layer composition before injection molding and the intermediate layer after molding. These samples were analyzed with Fourier transform infrared spectrophotometer (Auto IMAGE FT-IR) available from PerkinElmer, Inc by a macro ATR method (germanium prism, observation diameter: about 1 mm). The area A under a peak around 1600 cm$^{-1}$ and the area B under a peak around 1700 cm$^{-1}$ were determined from the obtained spectrum. FIG. 1 shows a FT-IR spectrum of the intermediate layer of the golf ball No. 1 (vertical axis: absorbance). Base lines were drawn for Peak A around 1600 cm$^{-1}$ and Peak B around 1700 cm$^{-1}$, respectively, as shown FIG. 1 and area A, B were calculated. It is noted that Peak A around 1600 cm$^{-1}$ may shift depending on kinds of metal neutralizing the carboxyl group.

[Production of Golf Balls]

(1) Production of Center

The center rubber compositions having the formulations shown in Table 1 were kneaded and heat-pressed in upper and lower molds, each having a hemispherical cavity, at 170° C. for 15 minutes to prepare spherical centers. The amount of barium sulfate was adjusted appropriately to make a golf ball have a weight of 45.4 g.

TABLE 1

| | Center No. | A | B | C |
|---|---|---|---|---|
| Formulation | BR-730 | 100 | 100 | 100 |
| | Zinc acrylate | 27 | 27 | 27 |
| | Zinc oxide | 5 | 5 | 5 |
| | Dicumyl peroxide | 0.9 | 0.9 | 0.9 |
| | Diphenyl disulfide | 0.5 | 0.5 | 0.5 |
| | Barium sulfate | Appropriate Amount*) | Appropriate Amount*) | Appropriate Amount*) |
| Properties | Diameter (mm) | 39.2 | 39.6 | 37.2 |
| | Center hardness (Shore D) | 41 | 41 | 41 |
| | Surface hardness (Shore D) | 50 | 50 | 50 |
| | Compression deformation amount (mm) | 3.8 | 3.8 | 3.8 |

Formulation: parts by mass
*)Depending on the cover composition, adjustment was made such that the golf ball had a mass of 45.4 g.
BR-730: Polybutadiene rubber: "BR-730 (high-cis polybutadiene)" manufactured by JSR Corporation.
Zinc acrylate: "ZNDA-90S" manufactured by Nihon Jyoryu Kogyo Co., Ltd.
Zinc oxide: "Ginrei R" manufactured by Toho Zinc Co., Ltd.
Barium sulfate: "Barium Sulfate BD" manufactured by Sakai Chemical Industry Co., Ltd.
Diphenyl disulfide: manufactured by Sumitomo Seika Chemicals Co., Ltd.
Dicumyl peroxide: "Percumyl (registered trademark) D" manufactured by NOF Corporation.

(2) Preparation of Intermediate Layer Composition and Cover Composition

Blending materials shown in Tables 2 to 7 were mixed with a twin-screw kneading extruder to prepare the intermediate layer composition and cover compositions in the pellet form. The extruding conditions of the intermediate layer composition were a screw diameter of 45 mm, a screw rotational speed of 200 rpm, and screw L/D=35, and the cylinder temperature of 140 to 200° C. The extruding conditions of the cover composition were a screw diameter of 45 mm, a screw rotational speed of 200 rpm, and screw L/D=35, and the mixtures were heated to 160 to 230° C. at the die position of the extruder.

TABLE 2

| Cover composition No. | | |
|---|---|---|
| Formulation (Parts) | Himilan AM7329 | 70 |
| | Nucrel N1050H | 30 |
| | Titanium oxide | 3 |
| Properties | Melt flow rate (g/10 min) | 25 |
| | Slab hardness (Shore D) | 59 |

Note on Table 2:
Himilan AM7329: Zinc ion neutralized ethylene-methacrylic acid copolymer ionomer resin available from Du Pont-Mitsui Polychemicals Co., Ltd
Nucrel 1050H: an ethylene-methacrylic acid copolymer (melt flow rate (190° C.*2.16 kg): 500 g/10 min, Bending stiffness: 79 MPa) available from Du Pont-Mitsui Polychemicals Co., Ltd
Titanium oxide: A220 manufactured by ISHIHARA SANGYO KAISHA, LTD (3) Production of Golf Ball Body The intermediate layer compositions obtained above were injection-molded onto the spherical centers to form the intermediate layers covering the centers and prepare spherical cores. Subsequently, golf balls were produced by injection-molding the cover composition onto the spherical cores to form the cover. Upper and lower molds for the intermediate layer and the cover have a spherical cavity with pimples, a part of pimples serves as a hold pin which is retractable.

Upper and lower molds for the intermediate layer have a spherical cavity with pimples, a part of pimples serves as a hold pin which is retractable. When molding the intermediate layer, the hold pins were protruded to hold the center after the center was put in. The intermediate layer composition was heated to 200° C. to 260° C. at the cylinder portion of the injection unit and charged into the mold held under a pressure of 15 MPa, and cooled for 30 seconds. Then, the mold was opened, and the cores were taken out from the mold.

When molding the cover, the hold pins were protruded to hold the core after the core was put in, the cover composition heated to 260° C. was charged into the mold under a pressure of 80 tons within 0.3 seconds, and cooled for 30 seconds. Then, the mold was opened, and the golf ball bodies were taken out from the mold. The surface of the obtained golf ball bodies were treated with sandblast, marked, and painted with a clear paint. The paint was dried in an oven at 40° C. to form a paint film, and golf balls having a diameter of 42.8 mm and a mass of 45.4 g were obtained. The results of evaluations with respect to the compression deformation amount and resilience of the golf balls were also shown in tables 3 to 6.

TABLE 3

| Golf ball No. | | | | 1 | 2 | 3 | 4 | 5 |
|---|---|---|---|---|---|---|---|---|
| Center No. | | | | A | B | A | A | A |
| Intermediate layer Composition | Resin component | (A)Component | Himilan AM7327(Zn) | 80 | 80 | 70 | — | — |
| | | | Surlyn 6320 (Mg) | — | — | — | 70 | 70 |
| | | | Himilan AM7331(Na) | — | — | — | — | — |
| | | | Himilan 1855 (Zn) | — | — | — | — | — |
| | | | Himilan AM7329 (Zn) | — | — | — | — | — |
| | | (B)component | Nucrel N1050H | 20 | 20 | — | 30 | 25 |
| | | | Nucrel N2050H | — | — | 30 | — | — |
| | | | PRIMACOR 5980I | — | — | — | — | — |
| | | | Nucrel AN4319 | — | — | — | — | 5 |
| | (C) component | | Zinc oxide | 1 | 1 | 8 | 1 | 0.5 |
| | | | Zinc hydroxide | — | — | — | — | — |
| | | | Zinc carbonate | — | — | — | — | — |
| | Magnesium stearate | | | — | — | — | — | — |
| | Titanium oxide | | | 3 | 3 | 3 | 3 | 3 |
| | Ultra marine blue | | | 0.04 | 0.04 | 0.04 | 0.04 | 0.04 |
| | P1 = A1/(A1 + B1) | | | 0.64 | 0.64 | 0.43 | 0.57 | 0.58 |
| | P2 = P2/(P1 + B2) | | | 0.88 | 0.88 | 0.93 | 0.84 | 0.74 |
| | P2/P1 | | | 1.4 | 1.4 | 2.2 | 1.5 | 1.3 |
| | Properties | Melt flow rate (g/10 min) | | 10 | 10 | 10 | 7 | 6 |
| | | Slab hardness (Shore D) | | 42 | 42 | 47 | 45 | 44 |
| | | Bending stiffness (MPa) | | 52 | 52 | 115 | 69 | 64 |
| Intermediate layer thickness (mm) | | | | 1.0 | 0.8 | 1.0 | 1.0 | 1.0 |
| Core Properties | Core center hardness (Shore D) | | | 41 | 41 | 41 | 41 | 41 |
| | Core surface hardness (Shore D) | | | 44 | 44 | 49 | 47 | 46 |
| | Compression deformation amount (mm) | | | 3.54 | 3.54 | 3.50 | 3.52 | 3.53 |
| Golf ball Properties | Cover thickness (mm) | | | 0.8 | 0.8 | 0.8 | 0.8 | 0.8 |
| | Compression deformation amount (mm) | | | 3.24 | 3.24 | 3.21 | 3.22 | 3.23 |
| | Coefficient of Restitution | | | 100.3 | 100.4 | 100.5 | 100.3 | 100.2 |
| | Shot feeling | | | A | A | A | A | A |
| | Durability (Index) | | | 120 | 113 | 124 | 112 | 116 |

Formulation: parts by mass

TABLE 4

| Golf ball No. | | | | 6 | 7 | 8 | 9 | 10 |
|---|---|---|---|---|---|---|---|---|
| Center No. | | | | A | A | A | A | A |
| Intermediate layer | Resin component | (A)Component | Himilan AM7327(Zn) | — | — | 80 | 60 | 60 |
| | | | Surlyn 6320 (Mg) | — | — | — | — | — |
| | | | Himilan AM7331(Na) | 70 | — | — | — | — |

TABLE 4-continued

| | | Golf ball No. | 6 | 7 | 8 | 9 | 10 |
|---|---|---|---|---|---|---|---|
| Composition | | Himilan 1855 (Zn) | — | 60 | — | — | — |
| | | Himilan AM7329 (Zn) | — | — | — | — | — |
| | (B)component | Nucrel N1050H | 30 | 30 | 20 | — | 40 |
| | | Nucrel N2050H | — | — | — | — | — |
| | | PRIMACOR 5980I | — | — | — | — | — |
| | | Nucrel AN4319 | — | 10 | — | 40 | — |
| | (C) component | Zinc oxide | 1 | — | 5 | 1 | 10 |
| | | Zinc hydroxide | — | 0.2 | — | — | — |
| | | Zinc carbonate | — | — | — | — | — |
| | Magnesium stearate | | — | — | — | — | — |
| | Titanium oxide | | 3 | 3 | 3 | 3 | 3 |
| | Ultra marine blue | | 0.04 | 0.04 | 0.04 | 0.04 | 0.04 |
| | P1 = A1/(A1 + B1) | | 0.57 | 0.71 | 0.64 | 0.52 | 0.40 |
| | P2 = P2/(P1 + B2) | | 0.85 | 0.79 | 0.94 | 0.84 | 1.00 |
| | P2/P1 | | 1.5 | 1.1 | 1.5 | 1.6 | 2.5 |
| | Properties | Melt flow rate (g/10 min) | 8 | 11 | 7 | 11 | 8 |
| | | Slab hardness (Shore D) | 44 | 50 | 43 | 37 | 46 |
| | | Bending stiffness (MPa) | 50 | 86 | 85 | 43 | 136 |
| Intermediate layer thickness (mm) | | | 1.0 | 1.0 | 1.0 | 1.0 | 1.0 |
| Core Properties | Core center hardness (Shore D) | | 41 | 41 | 41 | 41 | 41 |
| | Core surface hardness (Shore D) | | 46 | 53 | 45 | 39 | 48 |
| | Compression deformation amount (mm) | | 3.53 | 3.46 | 3.54 | 3.59 | 3.51 |
| Golf ball Properties | Cover thickness (mm) | | 0.8 | 0.8 | 0.8 | 0.8 | 0.8 |
| | Compression deformation amount (mm) | | 3.23 | 3.17 | 3.24 | 3.29 | 3.21 |
| | Coefficient of Restitution | | 100.3 | 100.3 | 100.6 | 100.3 | 100.4 |
| | Shot feeling | | A | B | A | A | A |
| | Durability (Index) | | 110 | 109 | 125 | 118 | 117 |

Formulation: parts by mass

TABLE 5

| | | Golf ball No. | 11 | 12 | 13 | 14 | 15 |
|---|---|---|---|---|---|---|---|
| Center No. | | | A | A | A | A | A |
| Intermediate layer Composition | Resin component | (A)Component Himilan AM7327(Zn) | — | 80 | 70 | 70 | 40 |
| | | Surlyn 6320 (Mg) | — | — | — | — | — |
| | | Himilan AM7331(Na) | 50 | — | — | — | — |
| | | Himilan 1855 (Zn) | — | — | — | — | — |
| | | Himilan AM7329 (Zn) | — | — | — | — | — |
| | (B)component | Nucrel N1050H | — | 20 | 30 | 30 | 60 |
| | | Nucrel N2050H | — | — | — | — | — |
| | | PRIMACOR 5980I | 50 | — | — | — | — |
| | | Nucrel AN4319 | — | — | — | — | — |
| | (C) component | Zinc oxide | — | — | — | 21 | 1 |
| | | Zinc hydroxide | — | — | — | — | — |
| | | Zinc carbonate | 15 | — | — | — | — |
| | Magnesium stearate | | — | — | 10 | — | — |
| | Titanium oxide | | 3 | 3 | 3 | 3 | 3 |
| | Ultra marine blue | | 0.04 | 0.04 | 0.04 | 0.04 | 0.04 |
| | P1 = A1/(A1 + B1) | | 0.38 | 0.64 | 0.77 | 0.37 | 0.32 |
| | P2 = P2/(P1 + B2) | | 0.90 | 0.64 | 0.78 | 1.00 | 0.67 |
| | P2/P1 | | 2.4 | 1.0 | 1.0 | 2.7 | 2.1 |
| | Properties | Melt flow rate (g/10 min) | 12 | 11 | 30 | *1) | 55 |
| | | Slab hardness (Shore D) | 49 | 42 | 46 | | 45 |
| | | Bending stiffness (MPa) | 133 | 44 | 178 | | 70 |
| Intermediate layer thickness (mm) | | | 1.0 | 1.0 | 1.0 | — | 1.0 |
| Core Properties | Core center hardness (Shore D) | | 41 | 41 | 41 | — | 41 |
| | Core surface hardness (Shore D) | | 50 | 44 | 48 | — | 47 |
| | Compression deformation amount (mm) | | 3.49 | 3.54 | 3.51 | — | 3.52 |
| Golf ball Properties | Cover thickness (mm) | | 0.8 | 0.8 | 0.8 | — | 0.8 |
| | Compression deformation amount (mm) | | 3.20 | 3.24 | 3.19 | — | 3.22 |
| | Coefficient of Restitution | | 100.4 | 100 | 100.2 | — | 99.9 |
| | Shot feeling | | B | A | B | — | A |
| | Durability (Index) | | 117 | 100 | 80 | — | 72 |

Formulation: parts by mass
*1) Impossible to mold

TABLE 6

| | | Golf ball No. | 16 | 17 | 18 |
|---|---|---|---|---|---|
| Center No. | | | C | A | A |
| Inter- | Resin | (A)Component Himilan AM7327(Zn) | 90 | — | — |

TABLE 6-continued

| Golf ball No. | | | 16 | 17 | 18 |
|---|---|---|---|---|---|
| mediate layer Composition | component | Surlyn 6320 (Mg) | — | — | — |
| | | Himilan AM7331(Na) | — | — | — |
| | | Himilan 1855 (Zn) | — | 70 | — |
| | Himilan AM7329 (Zn) | | — | — | 70 |
| | (B)component | Nucrel N1050H | 10 | — | 30 |
| | | Nucrel N2050H | — | 30 | — |
| | | PRIMACOR 5980I | — | — | — |
| | | Nucrel AN4319 | — | — | — |
| | (C) component | Zinc oxide | — | 5 | — |
| | | Zinc hydroxide | 3.5 | — | — |
| | | Zinc carbonate | — | — | — |
| | Magnesium stearate | | — | — | — |
| | Titanium oxide | | 3 | 3 | 3 |
| | Ultra marine blue | | 0.04 | 0.04 | 0.04 |
| | P1 = A1/(A1 + B1) | | 0.71 | 0.65 | 0.65 |
| | P2 = P2/(P1 + B2) | | 1.00 | 0.96 | 0.65 |
| | P2/P1 | | 1.4 | 1.5 | 1.0 |
| | Properties | Melt flow rate (g/10 min) | 2. | 5 | 25 |
| | | Slab hardness (Shore D) | 42 | 56 | 59 |
| | | Bending stiffness (MPa) | 63 | 127 | 178 |
| Intermediate layer thickness (mm) | | | 2.0 | 1.0 | 1.0 |
| Core Properties | Core center hardness (Shore D) | | 41 | 41 | 41 |
| | Core surface hardness (Shore D) | | 44 | 57 | 60 |
| | Compression deformation amount (mm) | | 3.53 | 3.43 | 3.40 |
| Golf ball Properties | Cover thickness (mm) | | 0.8 | 0.8 | 0.8 |
| | Compression deformation amount (mm) | | 3.23 | 3.15 | 3.12 |
| | Coefficient of Restitution | | 99.5 | 100 | 100.2 |
| | Shot feeling | | B | C | D |
| | Durability (Index) | | 105 | 81 | 75 |

Formulation: parts by mass

Notes on Tables No. 3 to No. 6
HIMILAN AM7327: a zinc ion neutralized ethylene-methacrylic acid-butyl acrylate ternary copolymer ionomer resin (Melt Flow Rate (190° C., 2.16 kg): 0.7 g/10 min, Bending stiffness: 35 MPa) available from Du Pont-Mitsui Polychemicals Co., Ltd.
SURLYN 6320: a magnesium ion neutralized ethylene-methacrylic acid-butyl acrylate copolymer ionomer resin (Melt Flow Rate (190° C., 2.16 kg): 1.0 g/10 min, Bending stiffness: 53 MPa) available from E.I. du Pont de Nemours and Company.
HIMILAN AM7331: a sodium ion neutralized ethylene-methacrylic acid-butyl acrylate ternary copolymer ionomer resin (Melt Flow Rate (190° C., 2.16 kg): 1.3 g/10 min, Bending stiffness: 25 MPa) available from Du Pont-Mitsui Polychemicals Co., Ltd.
HIMILAN 1855: a zinc ion neutralized ethylene-methacrylic acid-butyl acrylate ternary copolymer ionomer resin (Melt Flow Rate (190° C., 2.16 kg): 1.0 g/10 min, Bending stiffness: 87 MPa) available from Du Pont-Mitsui Polychemicals Co., Ltd.
HIMILAN AM7329: a zinc ion neutralized ethylene-methacrylic acid copolymer ionomer resin (Melt Flow Rate (190° C., 2.16 kg): 5 g/10 min, Bending stiffness: 221 MPa) available from Du Pont-Mitsui Polychemicals Co., Ltd.
Nucrel 1050H: an ethylene-methacrylic acid copolymer (melt flow rate (190° C.*2.16 kg): 500 g/10 min, Bending stiffness: 79 MPa) available from Du Pont-Mitsui Polychemicals Co., Ltd.
Nucrel 2050H: an ethylene-methacrylic acid copolymer (melt flow rate (190° C.*2.16 kg): 500 g/10 min, Bending stiffness: 82 MPa) available from Du Pont-Mitsui Polychemicals Co., Ltd.
PRIMACOR 5980I: an ethylene-acrylic acid copolymer (melt flow rate (190° C.*2.16 kg): 300 g/10 min, Bending stiffness: 80 MPa) available from Dow Chemical Company.
Nucrel AN4319: an ethylene-methacrylic acid-butyl acrylate ternary copolymer (melt flow rate (190° C.*2.16 kg): 55 g/10 min, Bending stiffness: 21 MPa) available from Du Pont-Mitsui Polychemicals Co., Ltd.
Zinc oxide: Yoneyama Yakuhin Kogyo Co., LTD (no surface treatment)
Zinc hydroxide: Yoneyama Yakuhin Kogyo CO., LTD
Zinc carbonate: Yoneyama Yakuhin Kogyo CO., LTD
Magnesium stearate: Nitto Kasei Kogyo K.K.
Titanium oxide: A220 manufactured by ISHIHARA SANGYO KAISHA, LTD The golf ball resin compositions comprising (A) an ionomer resin consisting of a metal ion-neutralized product of a ternary copolymer composed of an olefin, an α,β-unsaturated carboxylic acid having 3 to 8 carbon atoms and an α,β-unsaturated carboxylic acid ester; (B) a binary copolymer composed of an olefin and an α,β-unsaturated carboxylic acid having 3 to 8 carbon atoms and/or a ternary copolymer composed of an olefin, an α,β-unsaturated carboxylic acid having 3 to 8 carbon atoms and an α,β-unsaturated carboxylic acid ester, and (C) a zinc compound, wherein a content ratio ((A)/(B)) of (A) component to (B) component ranges from 50/50 to 80/20 in a mass ratio and a content of (C) component ranges from 0.1 part to 20 parts with respect to 100 parts by mass of a sum of (A) component and (B) component, and the golf ball resin composition has a melt flow rate (190° C., 2.16 kg) of 5 g/10 min or more were excellent in fluidity, and enabled to mold a thin intermediate layer. Further, P2/P1 were 1.1 or more in every golf ball resin composition of the present invention, thus it is confirmed that the neutralization was conducted with (C) the zinc compound. Golf balls No. 1l to No. 11, and No. 17 using these golf ball resin compositions were excellent in the shot feeling, durability and flight distance (Coefficient of Restitution).

Golf ball No. 12 is the case that the golf ball resin composition contains (A) the ternary ionomer resin and (B) the binary/ternary copolymer but does not contain (C) the zinc compound. Golf ball No. 13 is the case that the metal salt of a fatty acid was used to improve the fluidity, but the durability was lowered. Golf ball No. 14 is the case that the content of (C) the zinc compound was too high. Because of the low fluidity, it was impossible to mold the intermediate layer. Golf ball No. 15 was the case the content of (A) component was too low. The durability and flight distance were lowered. Golf ball No. 16 was the case that the content of (A) component was too high. The shot feeling was lowered and the flight distance was not improved. Golf ball No. 18 is the case that the binary ionomer resin was used in place of (A) the ternary ionomer resin. The shot feeling and durability were lowered.

The present invention is suitable for the golf ball having an intermediate layer consisting of an ionomer resin. This application is based on Japanese Patent application No. 2010-102534 filed on Apr. 27, 2010, the contents of which are hereby incorporated by reference.

The invention claimed is:

1. A golf ball comprising an intermediate layer formed by injection molding a golf ball resin composition in the absence of a fatty acid and/or a metal salt thereof, wherein the resin composition comprises a resin component and (C) a zinc compound,
    wherein the resin component consists of (A) an ionomer resin consisting of a metal ion-neutralized product of a ternary copolymer composed of an olefin, an α,β-unsaturated carboxylic acid having 3 to 8 carbon atoms, and an α,β-unsaturated carboxylic acid ester and (B) a binary copolymer composed of an olefin and an α,β-unsaturated carboxylic acid having 3 to 8 carbon atoms and/or a ternary copolymer composed of an olefin, an α,β-unsaturated carboxylic acid having 3 to 8 carbon atoms, and an α,β-unsaturated carboxylic acid ester,
    wherein a content ratio ((A)/(B)) of (A) component to (B) component ranges from 50/50 to 80/20 in a mass ratio and a content of (C) component ranges from 0.1 part to 20 parts with respect to 100 parts by mass of a sum of (A) component and (B) component, and the golf ball resin composition has a melt flow rate (190° C., 2.16 kg) of 5 g/10 min or more,
    wherein (A) component has a melt flow rate (190° C., 2.16 kg) ranging from 0.1 g/10min to 20 g/10min,
    wherein (B) component has a melt flow rate (190° C., 2.16 kg) ranging from 5 g/10min to 500 g/10min, and
    wherein the golf ball resin composition comprises only the (C) component as a component to neutralize non-neutralized carboxyl groups existing in the (A) component and (B) component.

2. The golf ball according to claim 1, wherein the intermediate layer has a thickness ranging from 0.5 mm to 1.3 mm.

3. The golf ball according to claim 1, wherein the golf ball resin composition has a bending stiffness ranging from 30 MPa to 350 MPa.

4. The golf ball according to claim 1, wherein the golf ball resin composition has a rebound resilience of 40% or more.

5. The golf ball according to claim 1, wherein the golf ball has a cover with a thickness ranging from 0.1 mm to 2.0 mm.

6. The golf ball according to claim 1, wherein the golf ball has a cover with a hardness ranging from 20 to 70 in Shore D hardness.

7. The golf ball according to claim 1, wherein (C) the zinc compound is zinc oxide, zinc hydroxide, or zinc carbonate.

8. The golf ball according to claim 1, wherein A1, A2, B1, and B2 defined below satisfy the following expressions:

$$P1 = A1/(A1+B1)$$

$$P2 = A2/(A2+B2)$$

$$0.3 \leq P1 \leq 1.0$$

$$0.3 \leq P2 \leq 1.0$$

$$1.1 \leq P2/P1 \leq 2.5$$

wherein A1 is defined as an area under a peak around $1600 cm^{-1}$ and B1 is defined as an area under a peak around $1700 cm^{-1}$ in a spectrum obtained by analyzing the golf ball composition before injection molding by FT-IR, and A2 is defined as an area under a peak around $1600 cm^{-1}$ and B2 is defined as an area under a peak around $1700 cm^{-1}$ in a spectrum obtained by analyzing the golf ball composition after injection molding by FT-IR.

9. The golf ball according to claim 1, wherein a degree of neutralization of the carboxyl groups contained in (A) the ionomer resin ranges from 20 mole% to 90 mole%, and a melt flow rate (190° C., 21.6kg) of (A) the ionomer resin ranges from 0.1 g/10min to 20g/10min.

10. The golf ball according to claim 1, wherein (A) the ionomer resin has a bending stiffness ranging from 10 MPa to 100 MPa and a slab hardness ranging from 20 to 70 in Shore D hardness.

11. The golf ball according to claim 1, wherein (B) component has a melt flow rate (190° C., 2.16 kg) ranging from 5 g/10min to 55 g/10min.

* * * * *